2,779,767
Patented Jan. 29, 1957

United States Patent Office 2,779,767

PROCESS FOR PRODUCTION OF PARALDEHYDE

John E. Mahan and Stanley D. Turk, Bartlesville, Okla., assignors to Phillips Petroleum Company, a corporation of Delaware No Drawing. Application January 19, 1953, Serial No. 332,092

4 Claims. (Cl. 260—340)

This invention in one of its aspects relates to the production of alkyl pyridines from acetaldehyde. In another of its aspects the invention pertains to the production from acetaldehyde of paraldehyde from which alkyl pridines are produced.

Alkyl pyridines can be produced by interaction of aldehydes or ketones with ammonia in the presence of a suitable catalyst. Acetaldehyde can be used as the starting material for the synthesis of alkyl pyridines, particularly 2-methyl-5-ethylpyridine, but a yield less than 50 percent is generally obtained. However, if acetaldehyde is first converted to paraldehyde yields of alkyl pyridines as high as 75 or 80 percent or even higher can be readily obtained. One method of operation is to convert the acetaldehyde to paraldehyde in the presence of a condensing agent or acid catalyst such as sulfuric acid, and to neutralize the acid catalyst with an excess of an alkali metal carbonate or hydroxide. The unreacted acetaldehyde is then removed from the paraldehyde by distillation, and the bottoms product containing the paraldehyde is transferred to a reactor where it is contacted with ammonia, in the presence of a suitable catalyst, and under conditions such that alkyl pyridines are obtained. When acetaldehyde is treated with an acid catalyst, an equilibrium mixture of acetaldehyde with paraldehyde is formed. It is desirable that unchanged acetaldehyde be removed from this equilibrium mixture in order that an optimum yield of the desired alkyl pyridine can be obtained. It would appear that treatment with an excess of an inorganic basic material to neutralize the acid catalyst, followed by removal of the acetaldehyde by distillation would accomplish the desired result. However, it has been found that during distillation of such a reaction mixture, a substantial amount of the paraldehyde undergoes reversion to acetaldehyde thereby greatly reducing the quantity of paraldehyde which is available for the pyridine synthesis step. While it is possible to treat the acetaldehyde-paraldehyde equilibrium mixture from the polymerization step with ammonia, either alone or after treating it with an alkali metal hydroxide, carbonate, or bicarbonate, there are disadvantages in connection with its use. Being volatile, the ammonia would be taken overhead with the acetaldehyde and would have to be separated prior to recycling the aldehyde to the polymerization unit. If not separated, more acid catalyst would need to be employed to neutralize the basic material prior to polymerization of the aldehyde. There is also a possibility that acetaldehyde-ammonia would form.

By operation in accordance with this invention difficulties in preparing alkyl pyridines due to reversion of paraldehyde to acetaldehyde are obviated. By the practice of this invention a process is provided for the production of pure aldehyde by polymerizing acetaldehyde to paraldehyde in the presence of a condensing agent, contacting the resulting mixture comprising acetaldehyde and paraldehyde with an anion exchange resin and subsequently distilling said mixture thereby separating acetaldehyde and paraldehyde, treatment with said anion exchange resin preventing reversion of paraldehyde to acetaldehyde during said distillation. Thus according to this invention paraldehyde-acetaldehyde equilibrium mixtures can be contacted with an anion exchange resin or first treated with an excess of a solution of an alkali metal hydroxide, carbonate, or bicarbonate, the aqueous phase separated, and the organic phase brought into contact with an anion exchange resin. By the practice of the invention a sufficient amount of stabilization occurs so that the acetaldehyde can be removed from the mixture by distillation without reversion of the paraldehyde, and the remaining material, comprising the paraldehyde, can then be employed for the synthesis of alkyl pyridines.

In the practice of this invention acetaldehyde is converted to paraldehyde in a polymerization unit in the presence of an acid-type catalyst such as sulfuric acid, phosphoric acid, hydrochloric acid, or salts of various inorganic acids, e. g., sodium bisulfate etc. The reaction mixture is transferred to an aldehyde treating zone where an excess of an aqueous solution of an inorganic basic material such as an alkali metal hydroxide, carbonate, or bicarbonate is added. The aqueous and organic phases are then separated, followed by contacting of the organic phase with an anion exchange resin. Finally the resulting material is distilled to remove unreacted acetaldehyde which is recycled to the polymerization unit. The bottoms product from the distillation step containing the paraldehyde, is transferred to a reactor for the production of alkyl pyridines. A suitable catalyst is added and an excess of ammonia is introduced, the temperature and pressure conditions being adjusted to a level such that the ammonia will react with the paraldehyde to produce alkyl pyridines. The products of the process are separated and unreacted ammonia is recycled to the pyridine synthesis step.

In the first step of the process acetaldehyde is converted to paraldehyde in the presence of an acid catalyst. It is generally the practice to charge a portion of paraldehyde to the reactor first, then introduce the catalyst, and finally add the acetaldehyde; or, if desired, the acetaldehyde can be added continuously and the acid catalyst introduced at intervals during the course of the reaction. The conversion of acetaldehyde to paraldehyde is an exothermic reaction and can become violent unless properly controlled. It is essential, therefore, that the acetaldehyde be added at such a rate that the desired temperature can be maintained. Use of the paraldehyde as a reaction medium and introduction of the catalyst at intervals also aid in controlling the reaction. The mixture is agitated throughout the reaction. The amount of catalyst employed in the trimerization of acetaldehyde is generally in the range of from 0.03 percent to 6 percent by weight based on the acetaldehyde employed, preferably from 0.05 to 3 weight percent. The conversion of acetaldehyde to paraldehyde is generally effected at temperatures in the range between 30° F. and 120° F., preferably between 40° F. and 110° F. The residence time in the polymerization unit will vary depending upon the temperature used. It is intended that sufficient time be allowed for equilibrium between the paraldehyde and acetaldehyde to be reached at the temperature employed. In general, the residence time will be in the range between 10 minutes and 5 hours and usually it is not more than three hours.

The reaction mixture from the polymerization step is then brought into contact with an anion exchange resin, or treated with an aqueous solution of an inorganic basic material and then contacted with an anion exchange resin. One method of operation is to pass the acetaldehyde-paraldehyde mixture over a fixed bed of the resin under conditions such that the desired stabilizing effect is accomplished and distill the mixture. Upon distillation acetaldehyde is taken overhead and recycled to the polymerization unit. The bottoms product contains the paraldehyde. When an inorganic basic material is used, an alkali metal hydroxide, carbonate, or bicarbonate is selected, with sodium compounds being more frequently used. Of the compounds which are applicable, the bicarbonates, particularly sodium bicarbonate, are preferred. An amount equal to at least the stoichiometric requirement, i. e., an amount sufficient to neutralize the acid catalyst, is employed and usually an excess is added such as from two to ten times, generally not more than five or six times the stoichiometric requirement. Any of the various anion exchange resins is applicable for treatment of the acetaldehyde-paraldehyde equilibrium mixtures. The polyamine-type anion exchange resins, which are frequently employed are generally regarded as those in which the amine groups have reacted with a hydronium ion in a manner analogous to the system $NH_3$—$H_2O$. In these resins the hydroxyl ion exists somewhat dissociated from the substituted ammonium ion and can be exchanged for other anions. While it is preferred that the acetaldehyde-paraldehyde equilibrium mixtures be treated with an alkali metal hydroxide, carbonate, or bicarbonate first, in the manner hereinbefore described, and then contacted with the anion exchange resin, treatment with the inorganic basic material can be omitted and as described the anion exchange resin used alone. The aldehyde mixture is ordinarily passed over a fixed bed of anion exchange resin, generally at temperatures in the range between 30 and 200° F., preferably between 50 and 150° F., at a rate in the range between 0.3 and 10, preferably between 0.5 and 8 volumes aldehyde mixture per volume of resin per hour. Treatment in this manner effects a degree of stabilization such that reversion of paraldehyde to acetaldehyde does not occur during distillation.

Besides the polyamine-type anion exchange resins there are other amine-type anion exchange resins, for example, the amine-aldehyde resins, the amine-aldehyde-cyanogen resins, the phenol-formaldehyde-amine resins, etc.

The amine can be any non-aromatic primary or secondary amine and may contain both primary and secondary amine groups. The term "non-aromatic amine" is used to describe those amines in which the amine nitrogen is not directly attached to an aromatic nucleus as in aniline or phenylene diamine. The proportion of non-aromatic amine to phenol can vary from a minimum ratio of amine to phenol of one to four, on a molar basis, to a maximum ratio of four to one. Examples of suitable non-aromatic reactive amines are methylamine, dimethylamine, ethylamine, diethylamine, butylamine, dibutylamine, octylamine, methyloctylamine, 2-ethylhexylamine, di-2-ethylhexylamine, benzylmethylamine, methylbenzylethylamine, ethylenediamine, ethylenetriamine, triethylenetetramine, tetraethylenepentamine, hydroxyethylethylenediamine, propylenediamine, piperazine, morpholine, piperidine, pyrrolidine, cyclohexylamine, methylcyclohexylamine, etc. The amine can be a commercial mixture of different non-aromatic amines or of primary and secondary non-aromatic amines of the same general type. Not only free amines can be reacted, but also their acid salts, such as the hydrochlorides or acetates. The amine can contain other functional groups, which are essentially neutral in character, such as hydroxyl or amino. Thus, there can be used aminoalkylene carboxylic amides such as N-aminoethyl malonamide or N-aminoethylaminoethyl acetamide, or polyamino alkanols such as aminoethyl aminoethanol, etc.

In phenol-formaldehyde-amine anion exchange resins phenol can be used or substituted phenols containing more than one nuclear hydroxyl group and/or other nuclear substituent, such as alkyl, alkoxy, aryloxy, acyl, aryl, aralkyl, alicyclic, or other similar group. The phenol can be monocyclic or polycyclic. Typical phenols are phenol itself, the various cresols and commercial mixtures thereof, tert-butyl phenol, amyl phenol, octyl phenol, diisobutyl phenol, cyclohexyl phenol, phenyl phenol, diphenylol, resorcinol, catechol, catechol-type tannins, diphenylol dimethyl methane, diphenylol sulfone, the naphthols, benzyl phenol, allyl phenol, etc. Any phenol having hydrogen available in positions ortho or para to the phenolic hydroxyl group may be used. Such phenols are generally called "methylol-forming phenols."

These anion exchange resins can be restored to their desired effectiveness by contact with a solution containing the desired anion, when operation is one of ion exchange. Excess regenerative solution is readily removed by washing.

The bottoms product from the aldehyde treating zone is transferred to a reactor where the synthesis of alkyl pyridines is effected by reaction with ammonia. The reactor is provided with an agitating means. The catalyst is added; air is removed by means of nitrogen or other inert gas; and excess ammonia is introduced, in aqueous solution or liquid phase. Ammonia and paraldehyde undergoing condensation are employed in mol ratios ranging from 1:1 to 12:1, but higher ratios can be used if desired. It is usually preferred to operate with mol ratios of ammonia to paraldehyde within the range from 2:1 to 10:1. Anhydrous liquid ammonia can be used if desired: however, ammonia and water are preferably supplied to the reaction in a ratio such that a water-ammonia solution containing 10 to 90 weight percent ammonia is formed. We usually prefer that the aqueous ammonia, calculated on the basis of ammonia and water only, be from 20 to 60 weight percent ammonia.

In our invention we employ fluorine-containing catalysts for the condensation of ammonia with paraldehyde to make the particular pyridine. Among the catalysts can be named by way of example, ammonium fluoride ($NH_4F$), ammonium bifluoride ($NH_4F \cdot HF$), boron trifluoride, preferably in a complex with ammonia or an amine, salts of fluoroboric acid, salts of the fluorophosphoric acids, salts of trifluoracetic acid and salts of fluosilicic acid. The salts of the acids named above are preferably the ammonium or metallic salts of the acids.

Sulfonic acid catalysts can also be employed, for example, the alkyl, cycloalkyl, aryl, alkaryl, and aralkyl sulfonic acids having not more than ten carbon atoms per molecule, the same substituted by non-interfering radicals. Also applicable are heterocyclic sulfonic acids, for example pyridine sulfonic acid, methylfuran sulfonic acid. Examples of suitable sulfonic acids to be employed as catalysts in accordance with our invention are: ethane, chloroethane, propane, isobutane, pentane, difluoropentane, cyclohexane, methylcyclopentane, toluene, xylene, phenylethane, phenyl-isobutane sulfonic acids.

We find it preferable to employ these catalysts in relatively small amounts. Usually from 0.2 to 10.0, preferably from 1.5 to 5.0, weight percent of catalyst based on the paraldehyde is employed. When the sulfonic acid catalyst is employed usually from 0.05 to 10 weight percent of the catalyst is used based on the weight of paraldehyde. Optimum reaction temperatures for the alkyl pyridine synthesis step are within the range from 300 to 650° F., preferably 450 to 550° F. The reaction is usually effected in the liquid phase, and, consequently, pressures at least sufficient to maintain the reaction mixture in the liquid phase are employed. When operating with a closed pressure reactor, the autogenous pressures developed by the reaction mixture at the reaction temperature are satisfactory. These pressures are usually within the range from 850 to 2500 pounds per square inch gauge. The reaction period, or residence time in the reactor, is generally in the range from five minutes to five hours, preferably no longer than two hours.

At the end of the reaction period of the products resulting from the reaction of ammonia and paraldehyde in accordance with this invention are separated by any means desired. One method comprises transferring the effluent to a stripping zone where unreacted ammonia is removed and recycled. The remaining material is mixed with benzene or other suitable solvent to extract any organic material which is dissolved in the aqueous phase. The mixture is then transferred to a settling zone where the organic and aqueous phases are separated. Any water present in the organic phase is taken overhead as a water-benzene azeotrope during removal of the benzene and the alkyl pyridines are then separated by fractional distillation. Any other methods which can be employed for separation and recovery of the products are considered within the scope of the invention.

The invention can be more readily understood by reference to the following illustrative examples.

Example I 2-methyl-5-ethylpyridine is produced by charging paraldehyde to a polymerization unit, adding concentrated sulfuric acid, adjusting the temperature to 105° F., and then introducing acetaldehyde slowly while the mixture is stirred. Since the reaction is exothermic, the acetaldehyde is added at a rate such that the temperature can be maintained at the desired level. Subsequent to the addition of the acetaldehyde, the mixture is stirred for about one hour. The reaction mixture is then transferred to a treating zone where sodium carbonate, in the form of an aqueous solution containing 13.5 weight percent sodium carbonate, is added and the mixture stirred for one hour after which the aqueous phase is separated and the organic phase is passed at room temperature (approximately 75° F.) over a bed of a polyamine-type anion exchange resin (Amberlite IR-4B) at the rate of 4 volumes of aldehyde mixture per volume of resin per hour. The mixture is then distilled to remove the acetaldehyde. The acetaldehyde which is taken overhead is recycled to the polymerization zone. Of the total aldehyde charged to the polymerization step, 71.4 weight percent is obtained as paraldehyde. The bottoms product which comprises paraldehyde is transferred to a pressure reactor where the synthesis of 2-methyl-5-ethylpyridine is effected. Ammonium bifluoride and sodium hexametaphosphate are introduced, air is swept out of the reactor with nitrogen and finally ammonia is added in the form of an aqueous solution. The reactor is closed and the temperature raised to the desired level. Agitation of the reactor is effected by an electrically driven platform rocker. At the end of the reaction period the mixture is transferred to an ammonia stripper where the ammonia is removed and can be recycled to the pyridine synthesis step. Benzene is added to extract pyridine bases from the aqueous phase, the aqueous and organic phases are separated, water is distilled along with the benzene as a water-benzene azeotrope, and 2-methyl-5-ethylpyridine is separated by fractional distillation. The following table shows the amounts of materials, reaction conditions, and yield of 2-methyl-5-ethylpyridine:

Aldehyde polymerization step:
  Paraldehyde, grams _____ 31
  Acetaldehyde, grams _____ 205
  Sulfuric acid, grams _____ 0.36
  Temperature, ° F. _____ 105
  Time after acetaldehyde addition, hours __ 1.0
Aldehyde treating step:
  Sodium carbonate, grams _____ 1.47
Pyridine synthesis step:
  Paraldehyde from previous step, grams __ 170
  Paraldehyde from previous step, mols ____ 1.286
  Ammonium bifluoride, grams _____ 2.0
  Sodium hexametaphosphate, grams _____ 1.0
  Ammonia, grams _____ 173
  Ammonia, mols _____ 10.17
  Mol ratio ammonia/paraldehyde _____ 7.91
  Water, grams _____ 211.0
  Grams NH$_3$/100 grams water _____ 82.3
  Residence time in reactor, hours _____ 0.5
  Temperature, ° F. _____ 490–500
  Per pass yield of 2-methyl-5-ethylpyridine (mol percent of theoretical based on paraldehyde charged to pyridine synthesis step) _____ 81

Example II

Three runs were made for the preparation of paraldehyde-acetaldehyde equilibrium mixtures in the presence of sulfuric acid as a catalyst and separation of the paraldehyde therefrom by treatment with an excess of an aqueous solution of a basic material, separation of the aqueous phase, and distillation of the organic phase to remove the acetaldehyde. For each run approximately 300 grams of paraldehyde was charged to a reactor equipped with a stirrer and a means for temperature control. Concentrated sulfuric acid was then added and acetaldehyde was introduced under 40 p. s. i. g. nitrogen pressure. Approximately two hours were required for the addition of 2000 grams of acetaldehyde. The temperature was kept between 102 and 109° F. during addition of the acetaldehyde and maintained at 105° F. for 30 minutes to one hour thereafter to allow time for the reaction mixture to reach equilibrium. Each acetaldehyde-paraldehyde equilibrium mixture was treated with a different basic material, using 2.92 times the stoichiometric requirement for run 1, 3.10 times the stoichiometric requirement for run 2, and 3.69 times the stoichiometric requirement for run 3. The aqueous phase was separated and the mixtures were then distilled. A description of each run follows:

(1) Sodium carbonate was added as a 13.5 weight percent aqueous solution and the mixture was stirred vigorously for an hour after which the aqueous phase was separated and the organic phase distilled to separate the acetaldehyde from the paraldehyde (boiling point of acetaldehyde, 70° F.; boiling point of paraldehyde, 255° F.). This treatment did not prevent reversion of paraldehyde to acetaldehyde, as shown in the table.

(2) Sodium hydroxide was added as a 10.5 weight percent aqueous solution and the mixture was stirred vigorously as before. After separation of the aqueous phase, the organic phase was distilled. Some reversion of paraldehyde to acetaldehyde occurred upon distillation.

(3) Treatment with sodium carbonate was effected as in (1), except that it was added as a 13.0 weight percent aqueous solution, the aqueous phase was separated, and the remaining material was then passed over 250 cc. of a polyamine-type anion exchange resin (Amberlite IR-4B) at room temperature at a rate of 1000 ml. per hour. Substantially no reversion of paraldehyde to acetaldehyde occurred when the mixture was distilled.

Two distillations were made as control runs, one using pure paraldehyde and the other a synthetic mixture of paraldehyde and acetaldehyde. No sulfuric acid was present and treatment with a basic material was omitted. No reversion of paraldehyde to acetaldehyde occurred.

The following table gives details of the runs and results obtained:

|  | Runs | | | Controls [1] | |
|---|---|---|---|---|---|
|  | 1 | 2 | 2 | 1 | 2 |
| $H_2SO_4$, percent, based on acetaldehyde charged. | 0.18 | 0.18 | 0.18 | | |
| Basic Material | $Na_2CO_3$ | NaOH | $Na_2CO_3$+Amberlite IR-4B[2]. | | |
| Basic material, percent based on acetaldehyde charged. | 0.57 | 0.45 | 0.72 | | |
| Distillation: | | | | | |
| Overhead to 176° F., percent | 67 | 58 | 16.6 | 0 | 16.3 |
| Overhead, 176-248° F., percent | | | 12.0 | 0 | 4.4 |
| Overhead and residue above 248° F., percent. | | | 71.4 | 100 | 79.3 |
| Acetaldehyde in charge by analysis, percent | 17.0 | | 17.2 | | 20.0 |
| Acetaldehyde in fractionation, percent | >67 | >58 | 17.2 | 0 | |
| Highest head temperature, ° F | 70 | 70 | 253 | 252 | 253 |
| Reversion to acetaldehyde | Yes | Yes | No | No | No |

[1] Control 1 was pure acetaldehyde and Control 2 was a synthetic mixture of paraldehyde and acetaldehyde.
[2] Produced by Rohm and Haas of Philadelphia. (See J. Am. Chem. Soc., vol. 69, 2874–2878 (1947)).

Referring again to the alkyl pyridine synthesis step, in some instances it may be found desirable to employ an emulsifying agent in the reaction mixture. It is preferred that any emulsifying agent so employed be soluble in at least one of the components of the reaction mixture. Emulsifying agents that can be used include salts of saturated or unsaturated fatty acids containing from six to 18 carbon atoms per molecule, sulfates such as lauryl sulfate, and sulfonates such as alkaryl sulfonates. Nonionic detergents such as ethylene oxide condensation products of organic acids, alcohols, mercaptans, phenols, amides, and the like, as well as cationic surface active agents of the quarternary ammonium ion type are also considered applicable.

In addition in the alkyl pyridine synthesis reaction we often employ as a component of the reaction mixture a small quantity of a phosphate glass of an alkali metal or alkaline earth metal, or a pyrophosphate of ammonia or alkali metal or alkaline earth metal, as additional catalyst for the reaction, synergist for the fluorine-containing catalyst, and/or corrosion inhibitor. These phosphates also often aid in working up the products by reducing emulsion formation. The amount employed is preferably from 0.05 to 10, and more preferably from 0.1 to 6, weight percent based on the paraldehyde charged. Calcium phosphate glasses can be used, but we usually employ water soluble alkali metal phosphate glasses, and prefer to use a water soluble sodium phosphate glass. Descriptions of these glasses and the methods of producing them are contained in the articles by Partridge, Chemical and Engineering News 27, 214–217 (1949) and by Schwartz et al., Industrial and Engineering Chemistry 34, 32–40 (1942). The metal phosphate glasses and particularly the sodium phosphate glasses, are readily prepared by heating the corresponding metal metaphosphate to a temperature above its melting point and rapidly cooling the resulting liquid to form a vitreous or glassy product. The glasses contain $P_2O_5$ and metallic oxides in varying amounts, and the ratio of $P_2O_5$ and metallic oxides extends over a wide range. More specifically, the glasses we employ can contain a minor, say 0.1 mol per cent, amount of metallic oxide, and the concentration of the metallic oxide may vary up to 60 mol per cent. The preferred glass is available commercially, and it is known as sodium hexametaphosphate. The preferred glass contains equimolar proportions of $Na_2O$ and $P_2O_5$.

Other embodiments and ramifications will, of course, occur to those skilled in the art, given the benefit of this invention.

We claim:

1. A process for the production of paraldehyde which comprises contacting a mixture comprising acetaldehyde and paraldehyde with an amine type anion exchange resin and subsequently distilling said mixture thereby separating acetaldehyde and paraldehyde, treating with said anion exchange resin preventing reversion of paraldehyde to acetaldehyde during said distillation.

2. A process for the production of paraldehyde which comprises mixing an equilibrium mixture of paraldehyde and acetaldehyde with aqueous solution of an inorganic basic material thereby forming an organic phase and an aqueous phase, contacting the organic phase with an amine type anion exchange resin, and subsequently distilling said mixture thereby separating acetaldehyde and paraldehyde, treating with said anion exchange resin preventing reversion of paraldehyde to acetaldehyde during said distillation.

3. A process for the production of paraldehyde which comprises polymerizing acetaldehyde to paraldehyde in the presence of a condensing agent, contacting the resulting mixture comprising acetaldehyde and paraldehyde with an amine type anion exchange resin and subsequently distilling said mixture thereby separating acetaldehyde and paraldehyde, treatment with said anion exchange resin preventing reversion of paraldehyde to acetaldehyde during said distillation.

4. A process for the production of paraldehyde which comprises polymerizing acetaldehyde to paraldehyde in the presence of an inorganic acid, adding one of the group consisting of an alkali metal hydroxide, carbonate and bicarbonate sufficient to neutralize said acid catalyst and any organic acid formed during said polymerization, separating the resulting mixture into an aqueous and an organic phase, contacting the organic phase comprising acetaldehyde and paraldehyde with an amine type anion exchange resin and subsequently distilling said mixture thereby separating acetaldehyde and paraldehyde, treatment with said anion exchange resin preventing reversion of paraldehyde to acetaldehyde during said distillation.

References Cited in the file of this patent

UNITED STATES PATENTS

| 1,300,451 | Morton et al. | Apr. 15, 1919 |
| 1,864,908 | Jaeger | June 28, 1932 |
| 2,318,341 | Thompson | May 4, 1943 |
| 2,479,559 | Dolnick et al. | Aug. 23, 1949 |
| 2,615,022 | Mahan | Oct. 21, 1952 |

FOREIGN PATENTS

| 147,000 | Great Britain | Mar. 17, 1921 |
| 488,595 | Canada | Dec. 2, 1952 |

OTHER REFERENCES

Nachod: "Ion Exchange" (Academic Press), p. 371 (1949).